United States Patent [19]

Boll

[11] Patent Number: 4,705,995

[45] Date of Patent: Nov. 10, 1987

[54] CONTROL CIRCUIT FOR AIRLESS SPRAY GUN

[75] Inventor: Hans-Joachim Boll, Markdorf, Fed. Rep. of Germany

[73] Assignees: Wagner International AG, Switzerland; J. Wagner GmbH, Fed. Rep. of Germany

[21] Appl. No.: 901,656

[22] Filed: Aug. 29, 1986

[30] Foreign Application Priority Data

Sep. 6, 1985 [EP] European Pat. Off. ......... 85111308.4

[51] Int. Cl.$^4$ ........................................... H02K 33/00
[52] U.S. Cl. ............................ 318/129; 318/345 H; 361/152
[58] Field of Search ................. 318/78, 119, 129, 305, 318/345 D, 345 H, 606, 686; 361/152, 154, 205; 323/217, 327; 417/416, 417

[56] References Cited

U.S. PATENT DOCUMENTS

| | | | |
|---|---|---|---|
| 4,138,708 | 2/1979 | Takeshima | 361/203 X |
| 4,517,620 | 5/1985 | Boll | 361/205 X |
| 4,636,961 | 1/1987 | Bauer | 318/305 X |

Primary Examiner—William M. Shoop, Jr.
Assistant Examiner—Bentsu Ro
Attorney, Agent, or Firm—Hill, Van Santen, Steadman & Simpson

[57] ABSTRACT

An airless spray gun includes a pump piston and a drive arrangement formed of a coil and a swinging armature for connection to an alternating current network. A suppression circuit is provided for periodically suppressing an arbitrarily selectable whole number of successive half-waves of the alternating current. A plurality of phase control circuits corresponding in number to the number of suppression stages is also provided, each of the phase control circuits effecting a phase-angle of fixed size and being permanently connected to one of the suppression stages to supply a phase-delayed signal of selected frequency to the drive arrangement.

29 Claims, 5 Drawing Figures

CONTROL CIRCUIT FOR AIRLESS SPRAY GUN

BACKGROUND OF THE INVENTION

1. Field of the Invention

The present invention relates to a control for an airless spray gun having a pump piston and a pump drive arrangement including a coil and a swinging armature.

2. Description of the Prior Art

In spray guns having a pump piston driven by a swinging armature, the swinging armature coil generally is connected directly to the alternating current network. The pump piston in such spray gun executes approximately six thousand strokes per minute. For an appropriately constructed nozzle, swinging armature, pump piston, restoring spring, etc., the spray gun provides good atomization of the paint for a prescribed maximum paint throughput rate. A satisfactory degree of atomization is still obtained when the paint feed is somewhat diminished by not too great a value.

In the known spray guns, the high piston frequency of six thousand strokes per minute is also used for a diminished paint feed rate. This high piston frequency leads to wear and a considerable amount of noise during operation.

Paint spray guns are also known wherein the piston frequency is selectively reduced for use at lower paint feed rates, the frequency being reduced from six thousand strokes per minute to three thousand strokes per minute. The lowering of the stroke rate is achieved by a frequency halving by the provision of a feed and control circuit between the control network and the swinging armature coil. The feed and control circuit essentially consists of a rectifier circuit which allows only half-waves of one polarity to pass therethrough. The spray guns, however, are designed to perform at a six thousand strokes per minute rate and, therefore, satisfactory results are not achieved at the lower stroke rate. For the same nozzle size, a substantial deterioration in the quality of atomization results from halving the quantity of paint output. Moreover, an increase in the peak and effective currents as a result of the frequency halving leads to heating of the swinging armature coil.

A known spray gun includes a phase-angle control for the half-wave signals, which is utilized when the gun is switched to three thousand strokes per minute operation. The phase-angle control used during operation at three-thousand strokes per minute effectively reduces power of the apparatus and, thus, reduces the risk of overheating for the swinging armature coil. By appropriately dimensioning the size of the phase-angle control, atomization quality is satisfactory at half frequency operation.

In European Patent Application No. 0,076,510, a phase-angle control in an airless spray gun is provided for operation at both six thousand strokes per minute and three thousand strokes per minute. At least one of two phase-angle control circuits includes a variable resistor to adjust the size of the phase-angle control. This enables the degree of atomization to be varied to obtain coarser aerosol particles or even to generate what is referred to as a wet stream, such as for instance, when spraying insecticides. Since the hydraulic and mechanical elements of the spray gun are tuned for use at six thousand strokes per minute, it is not possible to reduce the minimum conveying capacity by half while still having a satisfactory atomization quality when the frequency is halved.

In none of the known airless spray guns is it possible to reduce the paint throughput while maintaining an optimum atomization, such as is possible with a compressed air spray gun. A reduced paint throughput enables even untrained persons to carry out high quality painting jobs satisfactorily.

SUMMARY OF THE PRESENT INVENTION

It is an object of the present invention to provide an airless spray gun whose output can be reduced while retaining an optimum atomization of the material being sprayed. In the present spray gun, the material throughput rate can be throttled step by step into a range otherwise only accessible by compressed air spray guns. A reduction in the throughput quantity of material, such as paint, down to a few percent of the full output quantity is possible with the present airless spray gun.

These and other objects are accomplished by the provision of a suppression circuit in the control of the airless spray gun, the suppression circuit including either a counter or a timer circuit for periodically suppressing an arbitrarily selectable number of successive half-waves of the alternating current while others of the half-waves remain unaltered. A plurality of phase-angle control circuits effecting a phase-angle of a defined size are connected to respective ones of the suppression circuit stages. The output of the suppression circuit is connected to the pump drive arrangement to selectively reduce the throughput of the present airless spray gun.

The spray gun of the present invention has the great advantage that the operator can select a plurality of pump frequencies in the simplest way and, thus, nearly arbitrarily reduce the quantity of material delivered. An optimum degree of atomization is maintained even when the throughput is reduced. Thus, even the finest painting jobs can be carried out without problems. The spray gun of the present invention can nonetheless be manufactured in an economical and cost-favorable way.

In further developments of the present spray gun, between four and eight suppression stages are provided. The suppression circuit is an electronic counter module and the phase-angle control circuit is in the form of a register connected to a bipolar switch. The suppression circuit and phase-angle control can each take a variety of other forms as well, including a timer circuit with an adjustable potentiometer and an electronic counter module and a resistor register, and in particular, the counter module being an IC module. A key button preferably rotationally activates the suppression stages of higher and/or lower values, while a liquid crystal display is provided to indicate the suppression stage set thereby. Ones of the suppression stages are preselectable even when the key button is not pressed.

It should be pointed out that the number of suppression stages need not coincide with the number of successively suppressed half-waves of the alternating current. Instead, for example, two successive half-waves can be suppressed in the first suppression stage, five successive half-waves can be suppressed in the second suppression stage, and eight successive half-waves can be suppressed in the third suppression stage.

DESCRIPTION OF THE PREFERRED EMBODIMENTS

Figure 1:
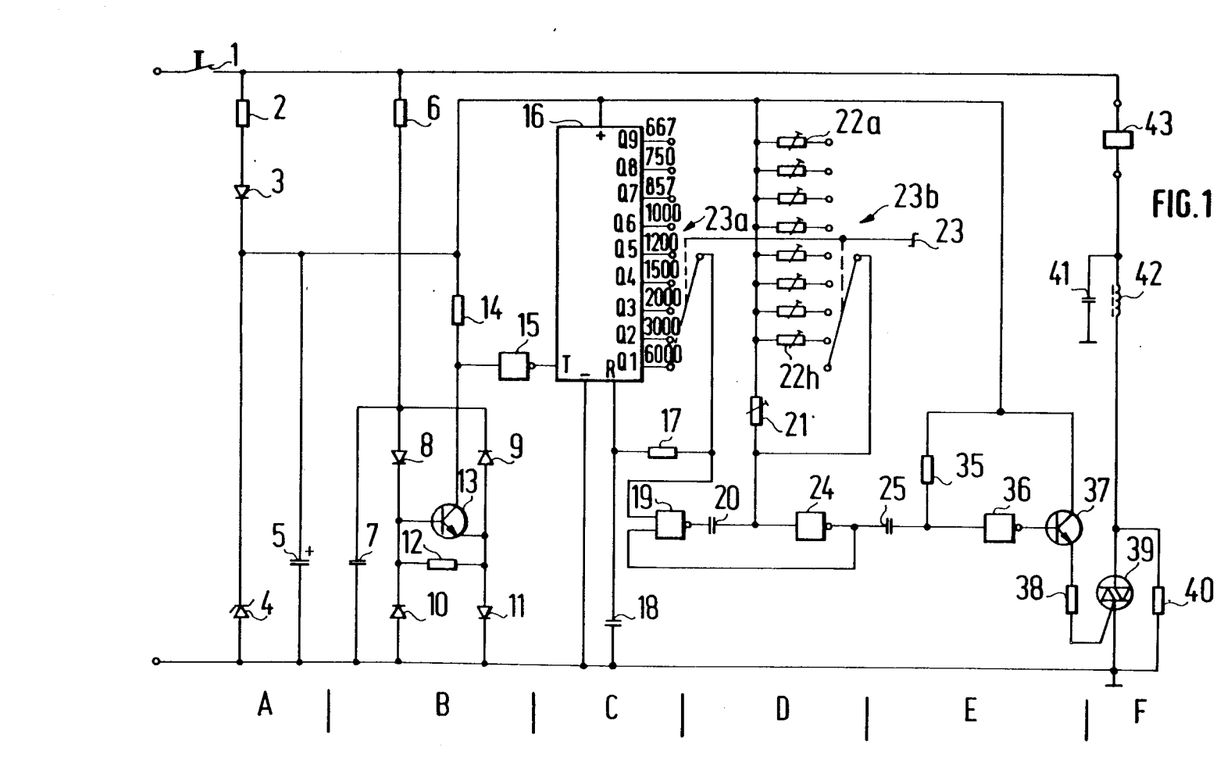
FIG. 1 is a circuit diagram of a control circuit for a spray pump drive according to the principles of the present invention.

In FIG. 1, a control circuit is shown for controlling the pump drive of a spray gun, the pump preferably being driven by a swinging armature that is mounted to and driven by an armature coil. A two-pole stepping switch is included by which the swinging armature coil is controlled. The control circuit is connectable to a standard alternating current source, which for purposes of the present description is a 220 volt, 50 Hz. source, although a 60 Hz. source and other voltages are contemplated as well. The output of the control circuit is fed to a coil 42 which represents the coil of the swinging armature. The coil 42 is controlled by the circuit to drive the pump piston of the spray gun.

The control circuit of FIG. 1 can be divided into six functional circuit parts, indicated by the letters A through F. The portion indicated generally by A is a voltage supply, while a no-voltage switch is shown at B; a counter circuit is indicated at C; a phase-angle control circuit at D; a triac trigger circuit at E; and a triac circuit at F. The voltage supply circuit A includes an on/off switch in the form of a key button 1 connected to a resistor 2 which is in series with a rectifier diode 3. The on/off switch 1 is usually in the form of a user operable trigger switch. A zener diode 4 is connected to the diode 3 and a capacitor 5 is connected in parallel to the zener diode 4. The voltage supply A generates a DC voltage of approximately 12 volts from the AC line power and, thus, functions as the power supply for other portions of the control circuit.

The no-voltage switch B is formed of a resistor 6, a capacitor 7, four diodes 8, 9, 10, and 11, between which are connected a resistor 12 and a transistor 13. A resistor 14 and a logic gate 15 are also provided. The no-voltage switch B emits a brief pulse at every zero-axis crossing, or no-voltage condition, of the main supply voltage. The pulses representing the zero-axis crossings serve to synchronize the circuit electronics with the frequency of the main AC supply, as well as serving as a source for counting pulses transmitted to the counter circuit.

The counter circuit C includes an electronic counter module 16 having a setting switch 23 and a following timer element formed by a resistor 17 and a capacitor 18. The counter module 16 is connected to receive and count the pulse sequence from the no-voltage switch B which represents the zero-axis crossings of the main AC supply. The counter module 16 acts to determine the actual frequency at which the pump piston is driven by the coil 42.

In the illustrated embodiment, the counter module 16 defines nine distinct stroke frequency steps, namely 6,000 strokes per minute, which corresponds to a full capacity output with a 50 Hz. supply frequency, and 3,000; 2,000; 1,500; 1,200; 1,000; 857; 750; and 667 strokes per minute for correspondingly lower output capacities. For a 60 Hz. supply, the frequencies would, of course, be different. The counter module 16 includes nine outputs Q1 through Q9 which are sequentially set to a high potential as the clock pulses are received from the no-voltage switch B. The outputs Q1 through Q9 are individually connectable to a reset input R of the counter module 16 through a first pole 23a of a manually actuatable bipolar control switch 23. When a high voltage is present at the output Q1–Q9 connected to the reset input R by the pole 23a of the switch 23, then the counter reading of the counter 16 is set back to zero and the short, positive voltage pulse on the reset input R is extended by the timing circuit elements 17 and 18.

By way of example, the output Q5 is connected to the reset input R by the switch pole 23a so that only every fifth zero-axis crossing pulse from the no-voltage switch B causes an output pulse from the counter circuit C and a simultaneous resetting of the counter 16. This corresponds to a frequency of 1,200 strokes per minute for the pump piston of the spray gun. Thus, the circuits B and C act as a suppression circuit to suppress selected ones of the AC signal half-waves. By turning the switch 23, the control pulses for any one of the aforementioned nine frequency steps of between 6,000 and 667 pulses per minute are selectively generated by the counter circuit C. The pulses generated by the counter circuit C are spaced equally from one another and each pulse is synchronous with a zero-axis crossing of the main AC supply.

The output pulses of the counter circuit C are subsequently subjected to a defined time delay in the phase-angle control circuit D. The phase-angle control circuit D is formed, in the illustrated example, by a one-shot multivibrator, the operation of which is started by an output pulse from the counter circuit C. The multivibrator is formed by logic gates 19 and 24, a capacitor 20, a resistor 21, and a resistor register. The resistor register includes eight resistors 22a through 22h of mutually different resistance values. In the phase-angle circuit portion D, the eight resistors 22a–22h are individually selectable by a second pole 23b of the manually actuatable switch 23. Depending on the position of the switch 23, the second pole 23b connects one of the resistors 22a through 22h in parallel with the resistor 21, except at the switch position corresponding to the full frequency, namely 6,000 strokes per minute where no resistor of the resistor register is provided. In other words, rotation of the switch 23 effects a connection through the first pole 23a of one of the outputs Q1 through Q9 of the counter modules 16 to the reset input R and, simultaneously through the second pole 23b, a parallel connection of one of the resistors 22a through 22h to the resistor 21 (with the exception of switch position Q1). For example, the parallel connection of the resistor 22e to the resistor 21 is made when the switch 23 is in the position corresponding to the output Q5 of the counter module 16.

The capacitor 20, in combination with the resistor 21, and the selected one of the resistors 22a through 22h, represents the RC time constant of the phase-angle control circuit D. Thus, for every switch position of the switch 23, the circuit D delays the pulses received from the circuit C by a defined, fixed time span. This delay relates to a phase-angle control allocated to the pump frequency with respect to the excitation of the coil 42. The provision of the resistors in the phase-angle control circuit D is such that an increase in the value of the equivalent resistance effects an increase in the time delay and, thus, in the phase-angle. Correspondingly, the phase-angle is diminished as the equivalent resistance and the frequency is diminished.

Output pulses from the phase-angle control circuit D are supplied to the triac trigger circuit E. The triac trigger circuit E, which edits the pulses for use as triac trigger pulses, includes a one-shot multi-vibrator in the form of a capacitor 25, a resistor 35, and a logic gate 36. A triac drive circuit includes a transistor 37 and a resistor 38. Together, the capacitor 25 and the logic gate 36 define the length of the trigger pulses from the triac trigger circuit E.

A triac 39 is connected in the triac circuit F, along with a resistor 40 connected in parallel thereto. The triac 39 is driven by the transistor 37 of the trigger circuit E to switch power to the coil 42 when the key button 1 is closed. A capacitor 41 and a series connected circuit component 43 are provided for noise suppression.

When an operator places the switch 23 into a position to connect, for example, the output Q5 of the counter module 16 to the reset input R, then the triac 39 receives trigger pulses with a trigger frequency of 1,200 beats per minute. The trigger pulses are of an adequate duration and strength for operation of the triac 39. The trigger pulses the trail the zero-axis crossings of the main AC signal by a defined time duration as determined by the combined resistance of the resistors 21 and 22e and by the capacitor 20. As a consequence thereof, the coil 42 is permeated by only every fifth half-wave of the main AC signal frequency, namely, with a defined phase-angle.

The effect on the operation of the spray gun is that the pump frequency can be diminished in steps from 6,000 piston strokes per minute, corresponding to the full main supply frequency, down to 667 strokes per minute, resulting in a reduction of the paint throughput. In a preferred embodiment, the paint throughput at 6,000 strokes per minute is 340 grams per minute, while the reduced throughput at 667 strokes per minute is approximately 37 grams per minute. The force per stroke of the spray gun pump is sufficient to guarantee an adequate paint pressure and, thus, a satisfactory paint atomization. The phase-angle associated to each pump frequency limits the mean power consumption of the coil to a maximum value so that there is no excessive heating of the coil. Also, an uncontrolled beating of the armature against the stator is prevented. Simply by adjusting the switch 23, the operator can vary the paint throughput in steps in the range of 340 through 37 grams per minute without deterioration of the degree of atomization and without heating of the unit.

Figure 2:
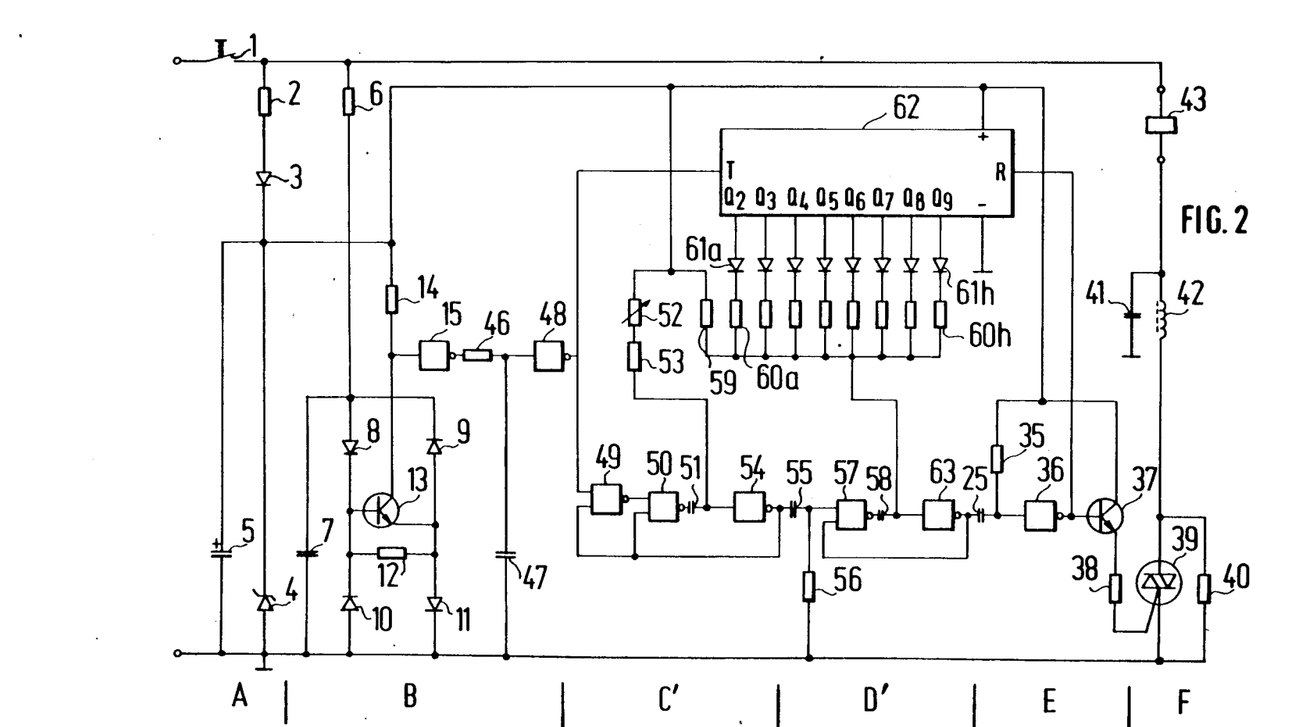
FIG. 2 is a circuit diagram of a second embodiment of the control circuit of the present invention.

With reference to FIG. 2, a second embodiment of the circuit is shown differing from the circuit of FIG. 1 essentially in that the counter circuit C is replaced by a timing circuit C' and the phase-angle control D is replaced by a differently constructed phase-angle control circuit D'. The voltage supply A, the no-voltage switch B, the triac trigger circuit E, and the triac circuit F are essentially unchanged from the circuit of FIG. 1.

In FIG. 2, the output signals of the no-voltage switch B from the logic gate 15 are supplied to the timing circuit C' through a gate 48. First, however, the output signals of the no-voltage switch B are filtered by an RC circuit formed of a resistor 46 and a capacitor 47. Here, the timing circuit C' is formed as a one-shot multi-vibrator by a logic gate 49 and 50, by a capacitor 51, a potentiometer 52, a fixed resistor 53, and a logic gate 54.

The execution of the timing circuit C' is variable by the manually adjustable potentiometer 52. The logic gate 50 blocks, or suppresses, the no-voltage pulses supplied from the gate 48 during the duration of the execution time. The gate 50 forwards the next successive no-voltage pulse to the phase-angle control circuit D' only after the execution time has elapsed. When, for example, the potentiometer 52 defines an execution time that expires after the fourth no-voltage pulse but before the arrival of the fifth no-voltage pulse, then the first four no-voltage pulses are suppressed. Only the fifth no-voltage pulse is allowed to pass therethrough. The operation of the timing circuit C' repeats thereafter because this fifth no-voltage pulse simultaneously restarts, or resets, the execution time. The potentiometer 52, thus, enables the frequency to be adjusted, as did the first switch pole 23a of the switch 23 in the circuit of FIG. 1.

A capacitor 55 and a resistor 56 differentiate the output pulses of the timing circuit C' and the differentiated pulses are supplied to the phase-angle control circuit D'. The phase-angle circuit D' likewise includes a one-shot multivibrator composed of a gate 37, a capacitor 58, and a resistor 59, along with a resistor register 60a through 60h with respective rectifier diodes 61a through 61h. A counter module 62 and another gate 63 are also included. The circuit D' generates a time delay from the no-voltage pulses received thereby to cause a phase-angle control in the power circuit of the coil 42. The length of the time lag and, thus, the size of the phase-angle derives from the time constant which is defined from the respective components 58, 59, and 60a through 60h. Just as with the components of FIG. 1, an increase in the resistance value, as determined by selection of one of the resistors 60a through 60h, effects an increase in the phase angle.

The circuit of FIG. 2 is distinguished from the circuit of FIG. 1, where the bipolar switch 23 provided a defined phase-angle value for every frequency reduction stage, in that no mechanical coupling is present between the potentiometer 52 and the phase-angle control circuit D'. The phase-angle circuit D', thus, must automatically electronically identify the frequency reduction stage which has been defined by the circuit C' so as to allocate thereto an appertaining phase-angle value for every frequency step. The counter module 62 performs this function wherein an input T is directly coupled to the output of the gate 48 of the no-voltage switch B. The counter module 62 receives every zero-axis crossing signal of the main AC supply from the switch B. At every zero-axis crossing signal, the counter module 62 increments one clock step, corresponding to the outputs Q2 through Q9 sequentially being set to a high signal. For every output pulse of the frequency reduction C', the corresponding correct resistor combination of the resistor 59 and one of the resistors 60a through 60h is connected in the circuit D'. The delay time from the zero-axis crossing of the main AC supply which defines the phase-angle is thereby determined.

Resetting of the counter module 62 ensues after every trigger pulse sent to the triac 39 by the reset input R of the counter module 62 being connected to the triac trigger circuit E. The phase-angle of a defined size to be allocated to every frequency reduction stage is, thus, effected in a similar way as was described hereinabove with respect to the circuit of FIG. 1, the only difference being that the counter module 62 is used in the phase-angle control D' to undertake an automatic allocation of the corresponding time element by counting off zero-axis crossings of the main signal frequency. Thus, the embodiment of FIG. 2 does not require mechanical coupling for setting the frequency reduction step.

The remaining elements of FIG. 2 are numbered as in FIG. 1, wherein like numerals refer to like parts.

Integrated circuits are preferably used as the counter module 16 for the circuit of FIG. 1 and the counter module 62 for the circuit of FIG. 2, such integrated circuit modules being presently commercially available. It is, of course, possible to combine the circuits of FIG. 1 and FIG. 2 so as to replace the phase-angle control circuit D in the circuit of FIG. 1 with the circuit D' of FIG. 2, or to replace the frequency reduction circuit of C' in the circuit of FIG. 2 with the circuit C of FIG. 1. In the former example, two counter modules 16 and 62 are utilized, while in contrast thereto, the latter example eliminates the use of counter modules and uses a frequency reduction circuit C' and a phase-angle control circuit D' that are switched in common by a bipolar switch.

Figure 3:
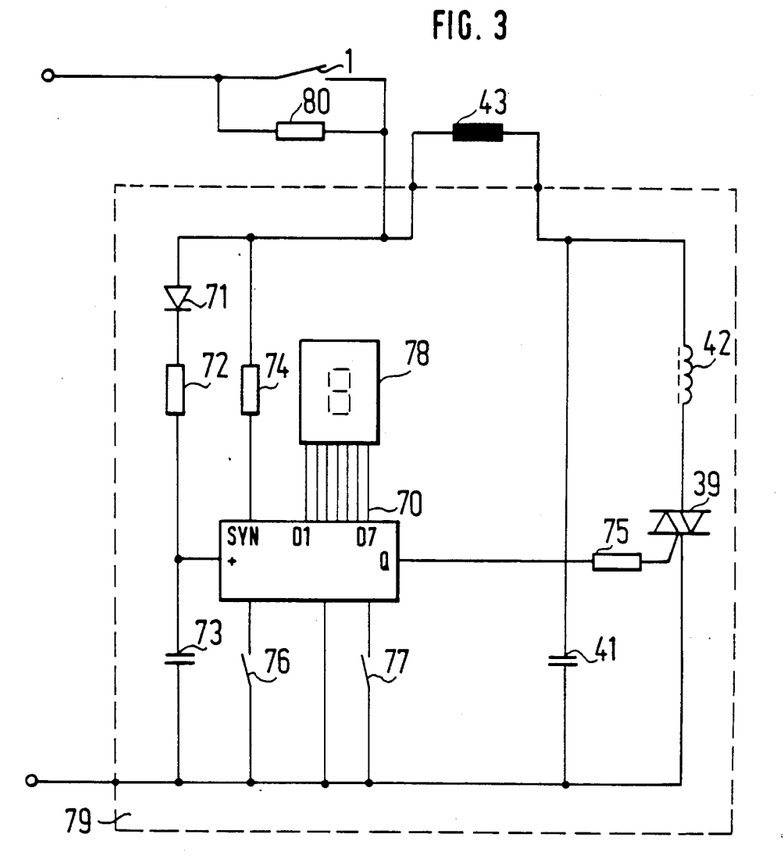
FIG. 3 is a circuit diagram of a third embodiment of the present control circuit.

Another embodiment of the circuit of the present invention is shown in FIG. 3, including a special module 70. The single module 70 is an integrated circuit (IC) module designed especially to fulfill all the functions of the circuit of FIG. 1, or of FIG. 2. In other words, the IC module 70 functionally contains a no-voltage switch B, the frequency reduction stage C, or C', the phase-angle control circuit D, or D', and the triac trigger circuit E. The IC module 70 preferably operates in a purely digital fashion, wherein all one-shot multi-vibrators are replaced by counter circuits.

A diode 71, a resistor 72, and a capacitor 73 generate a supply voltage for the module 70, which receives a synchronizing signal from the main AC supply through a resistor 74. A resistor 75 limits the maximum trigger current and is connected at an output of the module 70 leading to the triac 39. Two key buttons 76 and 77 are operable for changing the pump frequency, wherein actuation of the one key button 76 yields an increase in pump frequency and actuation of the other key button 77 yields a decrease in pump frequency by one frequency step, respectively. Additional logic capabilities are also integrated into the IC module 70 so as to control an LCD 78 (liquid crystal display) connected to the module 70. This option is available without significant additional cost. The display 78 provides a visible indication of the pump frequency or the suppression stage selected.

A PLL (phase-locked loop) circuit may also be incorporated into the IC module 70 easily and inexpensively. The PLL circuit automatically adapts the phase-angles to the main signal frequency. The capture range of the PLL circuit for the present 50 Hz. main AC signal frequency is, for example, from 45 through 65 Hz.

When the IC module 70 is constructed in CMOS technology and an LCD display is used, low power consumption results for the overall electronics module referenced generally at 79. A broad voltage range of, for example, 100 to 240 volts, may also be used for such circuitry.

Figure 3A:
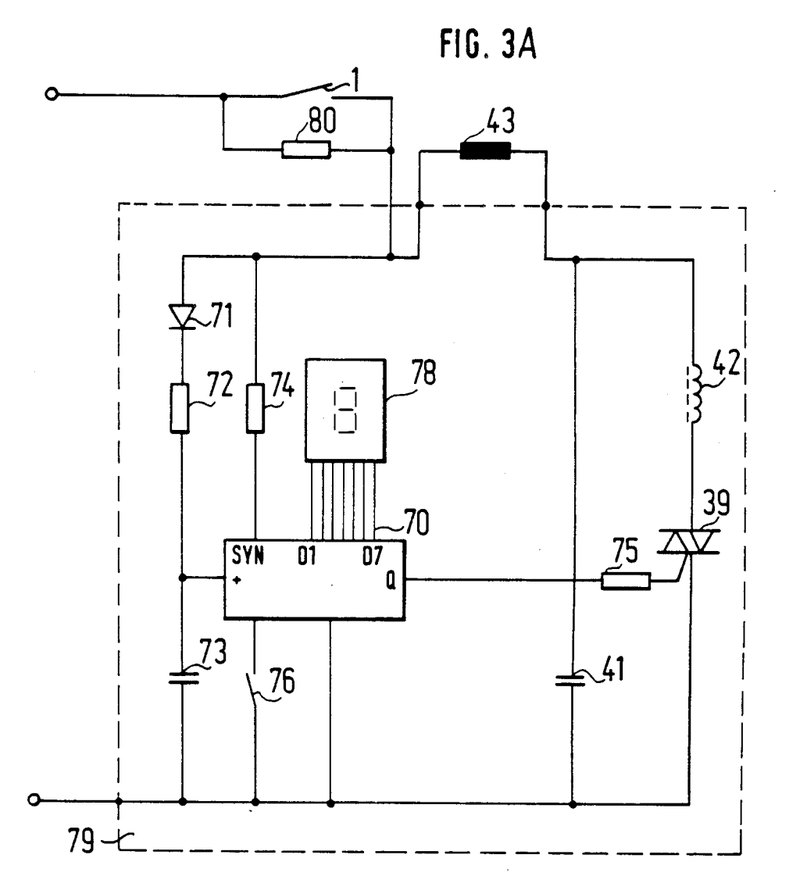
FIG. 3A is a circuit diagram of a control circuit of the present invention showing a slight modification of the circuit of FIG. 3.

In FIG. 3A, the circuit of FIG. 3 is modified such that a specific pump frequency is automatically selected when the main supply voltage is applied. This is accomplished by the key button 1 being bridged by a high impedance resistor 80. The specific pump frequency which is automatically engaged is preferably the highest pump frequency. Thus, for every actuation of a key button 76, the next lowest pump frequency is engaged. Once the lowest pump frequency has been reached, a further actuation of the key button 76 returns the circuit to the previously defined highest pump frequency. In other words, the selectable pump frequencies are switchable in rotation.

Apart from the distinctions set forth hereinabove for the circuits of FIGS. 3 and 3A, the functions thereof do not differ appreciably from that of the circuits of FIGS. 1 and 2 and, as such, no further explanation will be undertaken.

One great advantage of the circuits of FIGS. 3 and 3A is that for high volume production, very low costs are involved, and furthermore, the overall size is reduced, particularly when the entire circuit is constructed using "chip-on-board" technology along with SMD (surface mount device) elements.

The circuit of the present invention can be subject to numerous modifications, especially with respect to the frequency reduction steps, over the exemplary embodiments disclosed hereinabove. For example, it is possible to carry out the reduction down to the stroke frequency of one stroke per minute, although this would be meaningful only in exceptional cases. On the other hand, at least four reduction steps ought to be provided to realize the advantages available with the present circuit, for example, the frequency reduction steps corresponding to 3,000, 1,500, 1,000, and 667 strokes per minute from an initial full frequency of 6,000 strokes per minute.

In practice, it ought to be particularly practical to suppress eight to twelve half-waves so that a paint throughput of approximately 340 grams per minute at a full 6,000 strokes is reduced to about 20 to 40 grams per minute solely with frequency reduction. In addition, with the assistance of a mechanical quantity control, it is possible to undertake a special superfine adjustment of the mechanical-hydraulic components along with the electronically selected and defined stroke frequency and, thus, achieve an even further reduction of the paint throughput for a prescribed number of frequency reduction steps.

For a reduced pump frequency, work is carried out with an increased force per pump stroke as caused by the rising peak current. As a result, an excellent degree of atomization is achieved precisely at low pump frequencies and the atomization is still satisfactory when the quantity of paint is further reduced in a mechanical fashion.

By using additional mechanical quantity controls, it is possible to obtain paint throughputs at the tenth through twelveth suppression stage for paint output of between ten and twelve grams per minute, which is in the range hitherto obtainable only with compressed air paint spray guns. As such, it becomes possible to deliver a sufficiently low output quantity with the present airless nebulization device that even an untrained person can carry out extremely fine paint jobs.

Figure 4:
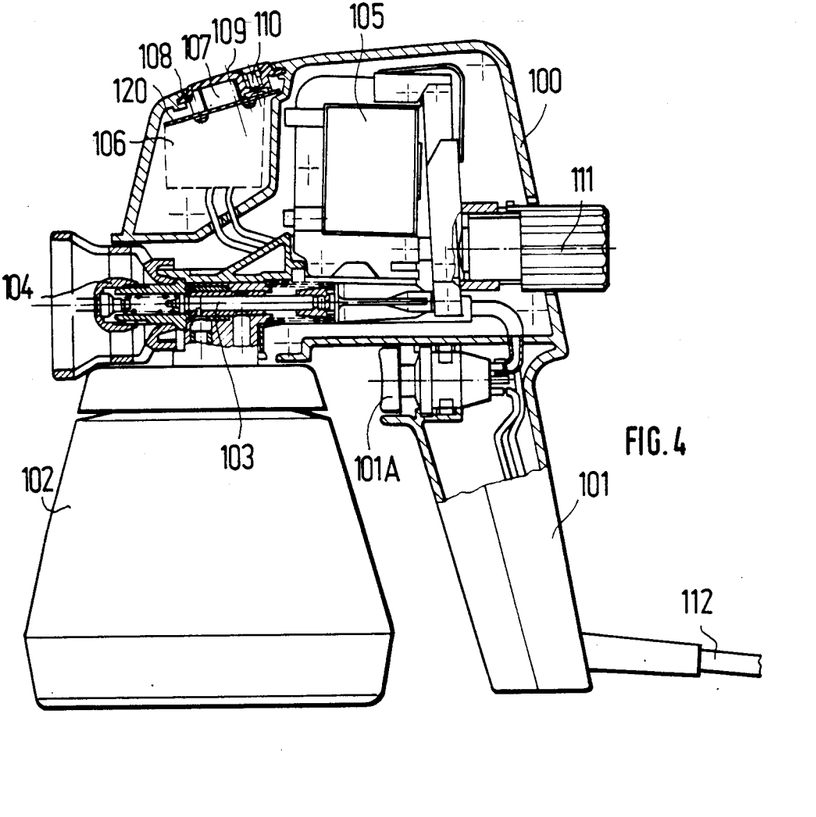
FIG. 4 is a side elevation, partially in cross-section of a spray gun incorporating a control circuit according to the principles of the present invention.

Referring now to FIG. 4, a spray gun of the present invention is shown schematically. A gun casing is referenced 100 and has a grip 101 extending therefrom with an on/off trigger switch 101A provided in the grip 101. A reservoir 102 for the medium to be sprayed is secured to the underside of the gun casing 100. The medium to be sprayed is drawn up by a pump 103 disposed in the gun casing 100 and is then conveyed to a spray nozzle 104. An electric swinging armature drive 105 is mounted within the gun casing 100 and drives the pump 103. An electronic control circuit 106 for the pump drive 105 is disposed within the gun casing 100 above the pump 103, the control circuit 106 being, for example, one of the circuits shown in FIGS. 1, 2, 3, and 3a. A display element 107 is held in a frame 108 and covered by a transparent film 109. The display element is thereby integrated in liquid-tight fashion within the gun casing 100 above the control circuit 106. The gun casing 100 is preferably formed of two casing halves. A key button 110 for adjusting the control circuit 106 corresponds, for example, to the key button 76 of FIG. 3A, while an adjustment means 111 is provided for mechanical variation of the ejection quantity of paint. An electric cord 112, which includes a plug. (not shown), serves to connect the gun to a standard AC power supply.

The control circuit 106 and the display 107 are mounted above the pump 103 and the far heavier electrical drive 105 is mounted above the grip 101 so as to produce optimum ergonomics when handling the spray gun and an optimum weight distribution in the hands of the operator. By mounting the display 107 in the frame 108 and covering it with transparent plastic film 109, the display 107 and the electronics module 106 situated therebelow are protected from paint drops, vapors, solvents, and the like. The display 107 can include a variety of display means, such as LCD elements or light emitting diodes.

The operator of the present device sets the desired frequency step, or suppression stage, by means of the key button 110, such as by pressing the key button 110 to effect a lowering of the frequency by one step. The selected frequency is shown to the user on the display 107. Alternately, the display shows the selected percentage of the full output quantity, or some other indication. At the moment the power cable 112 is plugged in, the display 107 is turned on, even though the pump drive 105 has not yet been turned on through actuation of the trigger 101A. This is achieved in that, with the assistance of a high impedance resistor 80, a voltage is constantly applied to the swinging armature coil 105, and is simultaneously applied to the electronic control circuit 106. The applied voltage is only high enough to just make the control electronics 106 and the display 107 operational, but not to activate the pump drive.

An additional change in the paint throughput is accomplished by turning the adjustment means 111 which mechanically varies the quantity of paint throughput, such as by changing the stroke length of the swinging armature. Maximum and minimum marks are preferably applied to the knob 111. It is also possible to apply electrical contacts to the rotary knob of the adjustment means 111, the electrical contacts being connected to the electronic control circuit 106 so that in addition to displaying the respective frequency level, the display 107 also indicates the position of the rotary knob 111. The control circuit 106, the display 107, and the key button 110 are arranged on a printed circuit board 120 which is secured to the frame 108 together with the film 109. The printed circuit board 120 is integrated into the casing 100 in liquid-tight and replaceable fashion.

Although modifications and changes may be suggested by those skilled in the art, it is the intention of the inventor to embody within the patent warranted hereon all changes and modifications as reasonably and properly come within the scope of his contribution to the art.

I Claim as my invention:

1. An airless spray gun for spraying a material from a reservoir, comprising:

a pump piston for pumping material from the reservoir;
   a drive arrangement having a coil and a swinging armature for driving said pump piston and an input for connection to an alternating current source;
   an output connected to said coil;
   a suppression circuit connected to said input to suppress an arbitrarily selectable whole number of successive half-waves of the alternating current source, said suppression circuit including a plurality of suppression stages to transmit corresponding ones of half-waves of the alternating current source in unaltered size and duration; and
   a plurality of phase-angle control circuits corresponding in number to the number of said suppression stages, each of said phase-angle control circuits being connected to one of said suppression stages and effecting a phase-angle of a predetermined size for transmittal to said coil.

2. An airless spray gun as claimed in claim 1, wherein said suppression circuit suppresses up to twelve successive half-waves of the alternating current source.

3. An airless spray gun as claimed in claim 1, wherein at least four suppression stages are provided.

4. An airless spray gun as claimed in claim 3, wherein eight suppression stages are provided.

5. An airless spray gun as claimed in claim 1, wherein said suppression circuit is a counter circuit having an electronic counter module with a plurality of outputs,
   wherein said phase-angle control circuits are formed by a register of fixed resistors, and further comprising: a bipolar switch connected to select at least one of said plurality of outputs of the counter module in conjunction with at least one of said fixed resistors.

6. An airless spray gun as claimed in claim 5, wherein said counter module is a commercially available IC module.

7. An airless spray gun as claimed in claim 5, further comprising:
   a main trigger switch; and
   a high impedance resistor connected in parallel to said main trigger switch.

8. An airless spray gun as claimed in claim 7, wherein said suppression stages are preselectable and displayable even before said main trigger switch is operated.

9. An airless spray gun as claimed in claim 1, wherein said suppression circuit is a timer circuit with an adjustable potentiometer, and
   wherein said phase-angle control circuits are formed of an electronic counter module and a register of resistors,
   whereby said counter module automatically allocates at least one resistor in said register to a selected one of said suppression stages set at said potentiometer.

10. An airless spray gun as claimed in claim 9, wherein said counter module and said timer circuit are each IC modules.

11. An airless spray gun as claimed in claim 1, wherein said suppression circuit is a timer circuit including an adjustable potentiometer, said potentiometer being formed by a stepping switch connected to fixed resistors, said stepping switch having a second level for setting the phase-angle at said phase-angle control circuits.

12. An airless spray gun as claimed in claim 11, wherein said timer circuit is an IC module.

13. An airless spray gun as claimed in claim 1, wherein said suppression circuit is a counter circuit, and
wherein said phase-angle control circuits are formed by an electronic counter module and a register of resistors.

14. An airless spray gun as claimed in claim 13, wherein said counter circuit and said counter module are each IC modules.

15. An airless spray gun as claimed in claim 13, wherein said electronic counter module is used for both said suppression circuit and said phase-angle control circuits.

16. An airless spray gun as claimed in claim 15, wherein said counter module is an IC module.

17. An airless spray gun as claimed in claim 1, wherein said suppression circuit and said phase-angle control circuits are integrated in a single IC module.

18. An airless spray gun as claimed in claim 17, further comprising:
a key button connected to said IC module to switch to higher ones of said suppression stages,
a second key button connected to said IC module to switch to lower ones of said suppression stages.

19. An airless spray gun as claimed in claim 18, further comprising:
a display means connected to said single IC module to indicate which one of said suppression stages is set.

20. An airless spray gun as claimed in claim 19, wherein said display means includes a liquid crystal display.

21. An airless spray gun as claimed in claim 17, further comprising:
a key button connected to switch said single IC module cyclically such that switching occurs from a higher one of said suppression stages to a lower one of said suppression stages, and from a lowest one of said suppression stages to a highest one one said suppression stages.

22. An airless spray gun as claimed in claim 21, further comprising:
a display means connected to said single IC module to indicated which one of said suppression stages is set.

23. An airless spray gun as claimed in claim 22, wherein said display means is a liquid crystal display.

24. An airless spray gun as claimed in claim 17, wherein said single IC module includes an automatic frequency control circuit.

25. An airless spray gun as claimed in claim 17, wherein said single IC module is a high impedance circuit formed in CMOS technology.

26. An airless spray gun as claimed in claim 1, further comprising:
an adjustment means connected for fine tuning said drive arrangement for providing mechanical quantity control of the output of said material being sprayed.

27. An airless spray gun as claimed in claim 1, wherein said suppression circuit and said phase-angle control circuits are formed as a unit, and further comprising:
a display disposed above said pump piston; and
a transparent film covering said display.

28. An airless spray gun as claimed in claim 27, further comprising:
a printed circuit board on which are mounted said circuit unit and said display;
a switch mounted on said printed circuit board;
a frame in which said printed circuit board is mounted;
said transparent film being secured in said frame; and
said printed circuit board being mounted in said airless spray gun in liquid-tight and interchangeable fashion.

29. A control circuit for an airless spray gun having a pump in a housing for ejecting material drawn from a reservoir and a driver for driving the pump and including a swinging armature moved by a coil, comprising:
a frequency reduction circuit connectable to AC power for suppressing ones of the half-waves of the AC power, said frequency reduction circuit being variable to suppress selected numbers of successive half-waves, and
a phase-angle control circuit connected to receive ones of the half-waves not suppressed by said frequency reduction circuit, said phase-angle control circuit connected to delay the nonsuppressed half-waves from said frequency reduction circuit for transmittal to the coil of the pump driver, said delay corresponding to the selected number of successive half-waves suppressed by said frequency reduction circuit,
whereby selection of a frequency reduction and a corresponding phase-angle enables a reduced quantity of material to be ejected from the spray gun while retaining atomization of the ejected material.

* * * * *